United States Defensive Publication [19] (H) [11] T102,101

Drake et al. [43] Aug. 3, 1982

[54] SOFT CONTACT LENSES RESISTANT TO OPACIFICATION IN USE

[76] Inventors: Nancy J. Drake, 11770 Jennifer Ct.; Charles J. Hora, 6344 Coleridge Rd., both of Painesville, Ohio 44077

[21] Appl. No.: 306,294

[22] Filed: Sep. 28, 1981

[51] Int. Cl.[3] ..... C08F 8/32; C08F 8/46

[52] U.S. Cl. ..... 525/183; 525/180; 525/181; 525/291; 525/301; 525/350; 525/351; 525/386; 351/160 R; 525/326.9; 525/329.5; 523/106; 523/108

[57] ABSTRACT

A hydrophilic polymer shaped article adapted for use as a soft contact lens is treated to provide at least on the surfaces thereof a modified, less hydrophilic polymeric structure inhibiting penetration by bacteria and proteins, whereby development of clouding and discoloration of the lens material during use is significantly retarded. Modification of the lens surfaces is effected by treatment of the lenses, either unhydrated or in a partially hydrated state, at a temperature ranging from room temperature to 100° C. and for a time period of 1 to 24 hours, with a water-soluble mono- or poly-carboxylic acid selected from alpha-amino acids, such as arginine, cysteine, glycine and like acids, aliphatic dicarboxylic acids or aromatic dicarboxylic and tricarboxylic acids, such as malonic, maleic, glutaric, citraionic, itaconic acid and the like. During treatment, the modifying acid becomes chemically and permanently incorporated into the hydrophilic polymer structure as evidenced by the fact that when treated with radioactive modifying acids, the lenses so treated permanently retain some labeled acid molecules ($^{14}C$ counts) which cannot be removed with continued leaching.

12 Claims, No Sheets Drawing,

19 Pages Specification

The file of this unexamined application may be inspected and copies thereof may be purchased (849 O.G. 1221, Apr. 9, 1968).